United States Patent
Armand

(10) Patent No.: US 7,419,120 B2
(45) Date of Patent: Sep. 2, 2008

(54) TRIPLE-FUSELAGE AIRCRAFT AND FAMILIES OF AIRCRAFT OF SAID TYPE

(75) Inventor: Georges Armand, Outremont (CA)

(73) Assignee: Sopravia Inc., Outremont (CA)

( * ) Notice: Subject to any disclaimer, the term of this patent is extended or adjusted under 35 U.S.C. 154(b) by 0 days.

(21) Appl. No.: 10/504,318

(22) PCT Filed: Mar. 21, 2003

(86) PCT No.: PCT/EP03/02992

§ 371 (c)(1),
(2), (4) Date: Aug. 23, 2004

(87) PCT Pub. No.: WO03/080436

PCT Pub. Date: Oct. 2, 2003

(65) Prior Publication Data

US 2005/0178911 A1 Aug. 18, 2005

(30) Foreign Application Priority Data

Mar. 22, 2002 (FR) .................................. 02 03641

(51) Int. Cl.
*B64C 1/00* (2006.01)
*B64C 1/26* (2006.01)
(52) U.S. Cl. .......................................... 244/36; 244/13
(58) Field of Classification Search .................... 244/36, 244/13, 25, 117 R, 35 R, 118.5, 227; D12/335–337
See application file for complete search history.

(56) References Cited

U.S. PATENT DOCUMENTS

| D112,834 S | * | 1/1939 | De Seversky | ............... D12/324 |
| 2,224,641 A | * | 12/1940 | Burnelli | ......................... 244/36 |
| D130,651 S | * | 12/1941 | Silverstein | .................. D12/335 |
| D158,736 S | * | 5/1950 | Frank | ........................... D12/323 |
| D188,226 S | * | 6/1960 | Jones | ......................... D12/335 |
| 3,348,513 A | * | 10/1967 | Dishart | ....................... 114/61.1 |
| D211,612 S | * | 7/1968 | Asis | ............................ D12/324 |

(Continued)

FOREIGN PATENT DOCUMENTS

CA          1314035          3/1993

(Continued)

OTHER PUBLICATIONS

WO 90/13479 published Nov. 15, 1990.

(Continued)

*Primary Examiner*—Tien Dinh
(74) *Attorney, Agent, or Firm*—Arent Fox LLP

(57) ABSTRACT

A method of air transport includes improved reliability and safety of passengers and cargo transported by an aircraft having three fuselages. The method includes locating a cockpit of the aircraft at a forward portion of the first fuselage and isolating the cockpit from a remaining portion of the aircraft. The cockpit is then shielded and independently pressurized from the remainder of the aircraft by controls housed in the cockpit. The method further includes distributing passengers and cargo among the three fuselages, such as by locating dangerous or suspicious passengers or cargo in the second and third fuselages away from the cockpit. Also, dangerous or suspicious passengers or cargo may be located in the second and third fuselages and, thereby, isolated from the remaining passengers and cargo.

8 Claims, 5 Drawing Sheets

U.S. PATENT DOCUMENTS

| | | | | |
|---|---|---|---|---|
| 3,738,595 A | * | 6/1973 | Bouchnik | 244/218 |
| 3,913,871 A | * | 10/1975 | Miller | 244/5 |
| 3,949,958 A | * | 4/1976 | Richter | 244/227 |
| 4,057,205 A | * | 11/1977 | Vensel | 244/118.5 |
| 5,425,515 A | * | 6/1995 | Hirose | 244/5 |
| 6,666,406 B2 | * | 12/2003 | Sankrithi et al. | 244/36 |
| 6,844,817 B2 | * | 1/2005 | Gleine | 340/574 |

FOREIGN PATENT DOCUMENTS

| | | |
|---|---|---|
| DE | 297 13 042 U1 | 3/1998 |
| EP | 1 167 183 A2 | 1/2002 |
| FR | 2 623 468 | 5/1989 |

OTHER PUBLICATIONS

WO 99/52759 published Oct. 21, 1999.

* cited by examiner

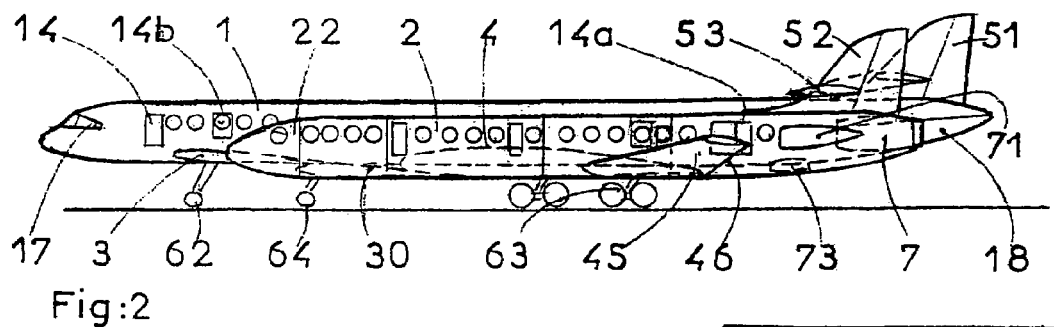
Fig:2
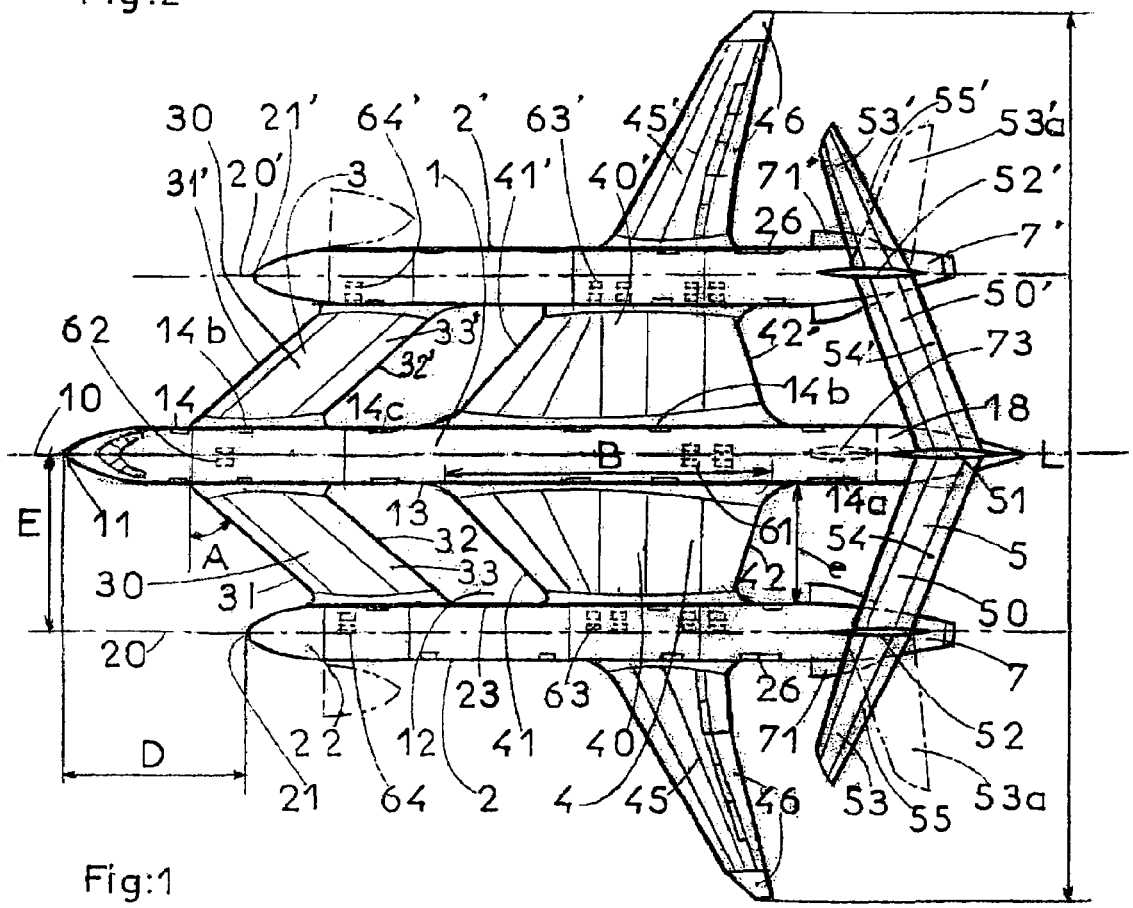
Fig:1
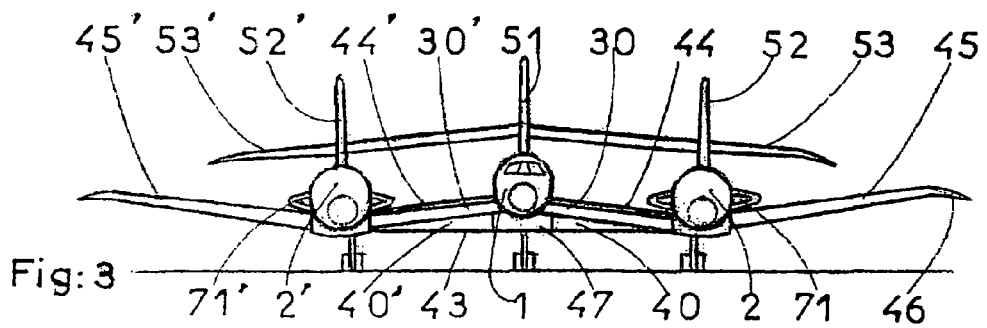
Fig:3

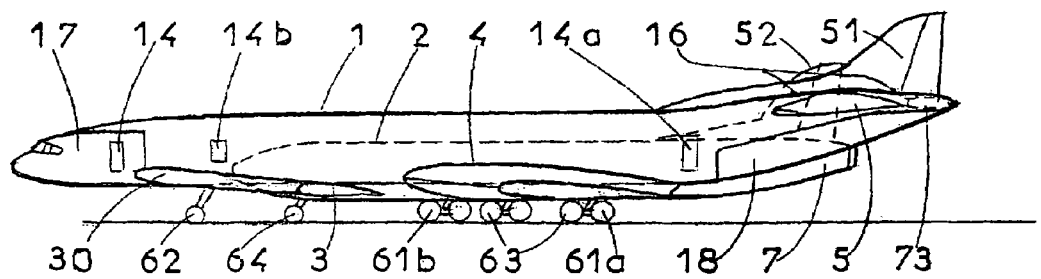
Fig:7
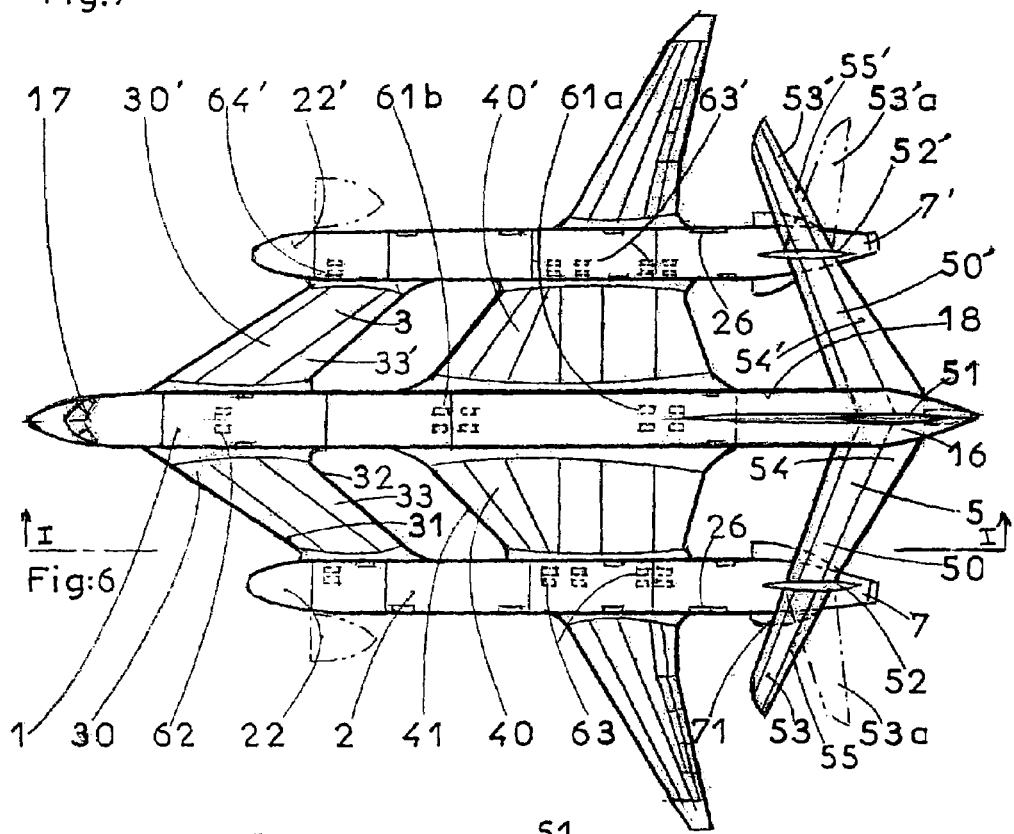
Fig:6
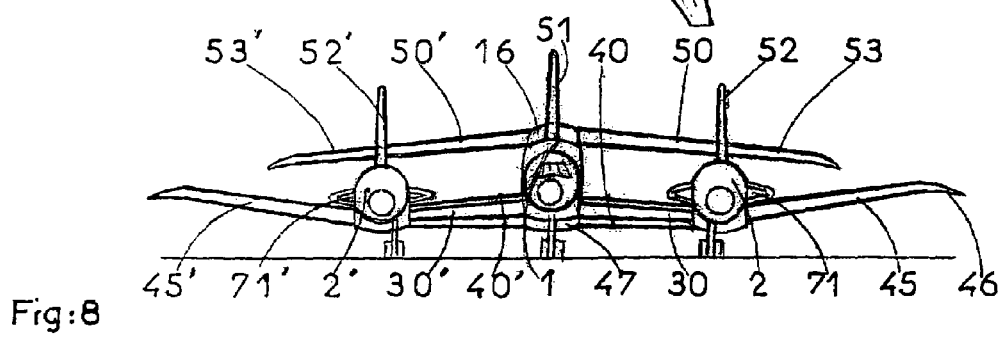
Fig:8

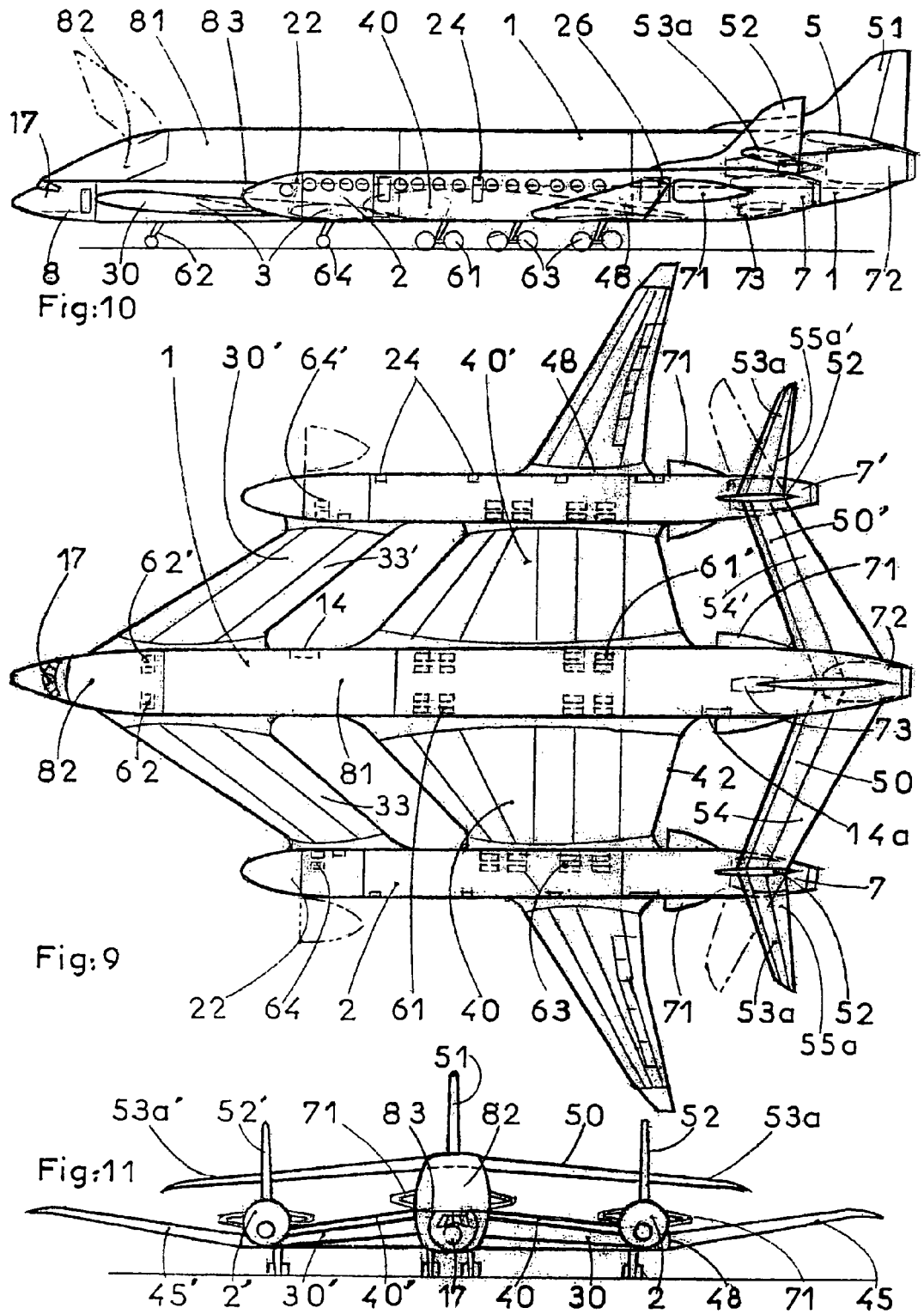

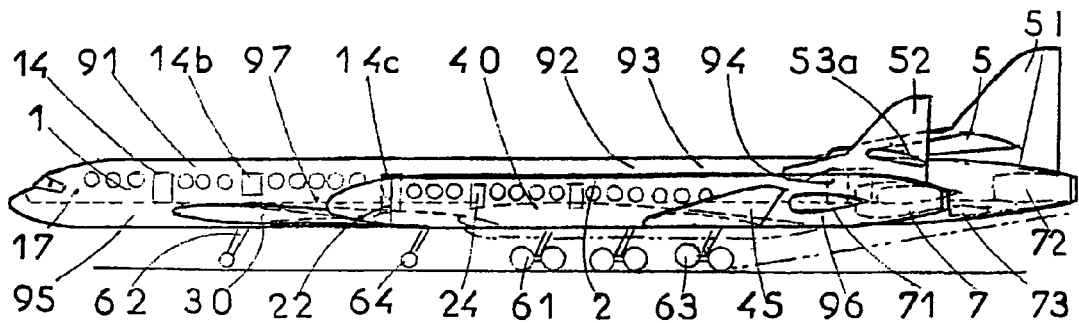
Fig:13
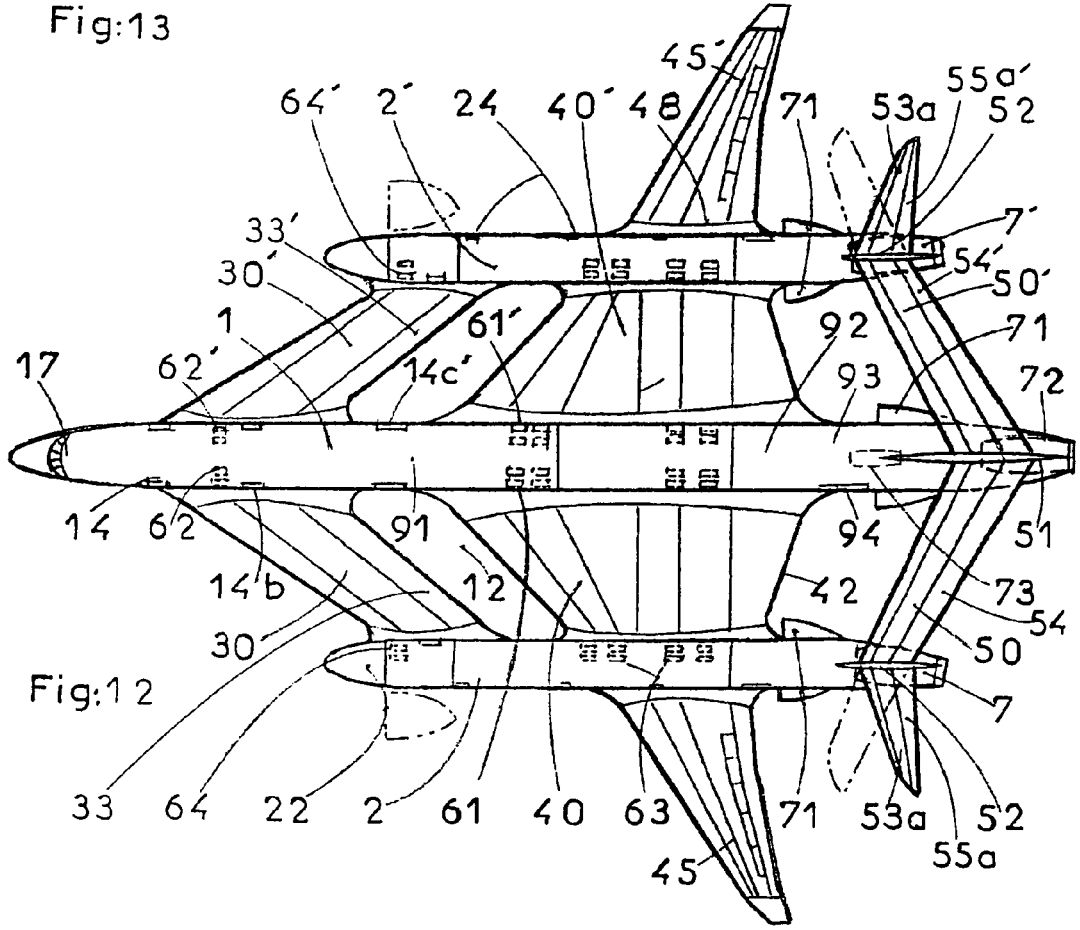
Fig:12
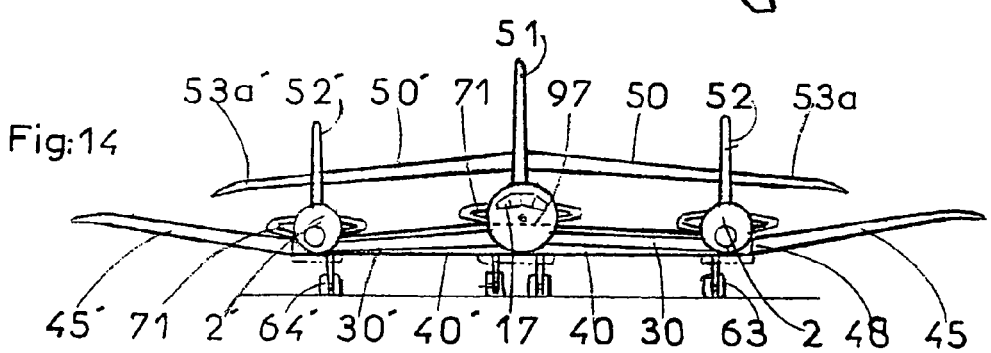
Fig:14

TRIPLE-FUSELAGE AIRCRAFT AND FAMILIES OF AIRCRAFT OF SAID TYPE

CROSS-REFERENCE TO RELATED APPLICATION

This application is a National Stage entry of International Application No. PCT/EP03/02992, filed Mar. 21, 2003, the entire specification claims and drawings of which are incorporated herewith by reference.

The invention relates to a three-fuselage aircraft enabling, in particular, to improve considerably the capacity of transportation and the possibilities of use with respect to an aircraft of conventional type, without improving substantially its space requirements, in order to facilitate its possibilities of evolution on the airports.

Such a type of aircraft may, moreover, be realised in several versions including, either three fuselages of same section, or a central fuselage fitted with a wider cross-section than both lateral fuselages. Moreover, according to the operating mode and the load to be transported, propulsion may be ensured either by three jet-engines mounted at the tail or rear cone of each fuselage, or by two jet-engines equipping only the lateral fuselages. It is thus possible from one or two basic fuselages, to define at least two true ranges of aircrafts with multiples possibilities.

On the other hand, the invention enables to improve the reliability and the safety in air transportation thanks to the diverse arrangement possibilities of such type of aircraft.

For several years, the aeronautical manufacturers and the operators have been confronted with the problems of constant increase in air traffic, as well as regards the freight as the transportation of passengers. To solve these problems, it has been tried, first of all to improve the receiving capacities of the existing airports, but, in the industrialised countries, said airports are close to saturation. It is therefore necessary to build new airports but, unless they can be located much too far from urban centres, sufficiently large plots cannot be found any longer to enable the construction of an international airport without causing excessive disturbance to the environment.

It has thus proven necessary to improve the capacities of transportation and, consequently, the dimensions of the aircrafts.

Generally speaking, in the commercial aviation, and in particular for the transportation of passengers, three types of aircrafts are normally distinguished, relative to their sizes, respectively, short distance-type aircrafts whereof the fuselage accepts rows of two to four rows of seats, medium distance-type aircrafts which include rows of five to six seats and long distance-type aircrafts or large carriers which include rows of seven to ten seats. The same types of fuselages may be arranged for the transportation of freight.

However, a jumbo jet may not always be accommodated on the existing airports. Indeed, the international regulation limits the space requirements of an aircraft to a square of 80 meter-sides approximately and the airports capable of accommodating very large aircrafts are very rare.

Taking into account the necessary surface areas, the international airports are further and further from urban centres and therefore, business and regional aviation have been developed, using smaller aircrafts which may be accommodated on small airports situated closed to certain towns. However, it is probable that, in the future, this notion of compactness will extend, with adapted regulation, from provincial airports to regional airports and to so-called STOL very small airports.

On the other hand, regardless of the type of airport, the acceptable daily number of take-offs and of landings remains limited, if only by the constraints of air traffic control. It appears therefore necessary, for each type of aircraft to improve the transportation capacities, as well for freight as for passengers, while limiting the dimensions of the aircraft so that the latter remain compatible with the possibilities of the airport.

Besides, recent events have shown the absolute necessity to improve the reliability of air transportation, notably by developing new prior control procedures of the people transported and of the luggage. However, one may not rule out the boarding of dangerous people or luggage and it would therefore be useful to built aircrafts capable of sustaining an explosion, for example in the cargo compartment, without being necessarily destroyed, as it is the case today.

Finally, it is indispensable that, in all cases, the cockpit remains sheltered from any aggression and fully in control of the flight operations.

The problems facing the aeronautical industry are hence quite various.

Still, it has appeared, surprisingly, that such problems, although very often contradictory, could be solved simultaneously if the transportation capacity of the aircraft were distributed over three separate fuselages.

The principle of an aircraft of such type had been contemplated in the French patent n°2 623 468 of the same inventor, which described succinctly a three-fuselage aircraft, respectively a central fuselage and two lateral fuselages connected together by fixed wings.

Bearing in mind that this type of aircraft would enable to solve the problems raised currently in air transportation, the inventor has sought to improve the performances thereof and has discovered that it was possible, by modifying the apportionment of the airfoil surfaces and, notably, by increasing the surface area of the central fixed wing, to improve substantially the loading capacity while keeping a length of fuselage and a total span compatible with the possibilities of the airports.

The invention relates therefore to a type of aircraft comprising three fuselages spaced apart transversally from one another, respectively a central fuselage and two lateral fuselages each having a rear stabilizer and connected together by at least two positive supporting surfaces spaced apart longitudinally from one another, respectively a front airfoil and a central wing, each including two fixed supporting surfaces extending on both sides of the central fuselage between the latter and each lateral fuselage, the central wing being extended by an external wing beyond each lateral fuselage.

According to the invention, both front fixed wings and both central fixed wings exhibit leading edges tilted symmetrically by a positive sweep angle of at least 40°, and the surface of each free space comprised between the trailing edge of a front fixed wing and the leading edge of the central wing situated behind is of the same order as the surface covered by said front wing.

Such an arrangement enables notably to improve the slot effects between the front wings and the central wings and, thus, to improve the performances of the airfoil surfaces, which enables to limit the span thereof.

On the other hand, therefrom results that the nose of the central fuselage is offset ahead of the noses of the lateral fuselages, such offset which may be of the same order as the distance between the axes of a lateral fuselage and of the central fuselage.

This arrangement enables in certain versions, to improve the commercial load in the central fuselage, with respect to the lateral fuselages and to improve rear lateral visibility of the pilots.

Besides, the depth of the central fixed wings is thereby increased, which may be, advantageously, at least equal to 2.5 times the spacing between the flanks of a lateral fuselage and of the central fuselage. This enables to increase still further the commercial load in the central fuselage, proportionally to the increase in the wing surfaces connected thereto.

The central fixed wings thus form a truncated delta wing and, because of the large surface area thereof and of its lift capacity, the assembly of the central fixed wings and of the external wings which prolong the latter beyond each lateral fuselage, possesses a total span which does not exceed three times the depth of the central fixed wings along the central fuselage, this enables to reduce the space occupied between the passenger fingers in the air terminals and to facilitate extrapolations of the same type of aircraft, for example three-engine or four-engine aircrafts.

In a preferred embodiment, the external wings prolonging the central fixed wings extend each transversally over a distance not exceeding twice the distance between the flanks of each lateral fuselage and of the central fuselage, and may be fitted, on their external ends and their trailing edges, means for improving lateral control, in order to compensate for the high inertia of the lateral fuselages.

In order to develop the wing surfaces still further around the central fuselage with respect to the lateral fuselages, the leading edges of the central fixed wings have, preferably, a sweep angle greater of at least 10° than the sweep angle of the leading edges of the external wings. Moreover, the leading edges of the front fixed wings have a sweep angle greater than the leading edges of the central fixed wings, in order to enable greater lengthening of the central fuselage at the front, and to amplify the slot effects on the wing surfaces close thereto, which are thus provided with greater depths.

On the other hand, the trailing edges of the central fixed wings have advantageously a negative sweep angle of the order of 15°, which enables, in case when the central fuselage is fitted with a jet-engine, to bring the air inlets thereof closer to the trailing edges of the central fixed wings.

According to another advantageous characteristic, both central fixed wings have each a lower face with substantially zero dihedron and an upper face with reverted dihedron. Preferably, each fixed front wing possesses a lower face and an upper face with reverted dihedron, the upper face being substantially parallel to that of the central fixed wing situated behind.

Thus, the conditions of circulation of the air streams are improved and the lift is increased.

To balance the lengthening of the central fuselage towards the front, it is also possible to lengthen said fuselage proportionally towards the back, beyond the rear ends of both lateral fuselages. The rear horizontal tail unit comprises then, advantageously, two fixed wings with negative sweeps with reverted dihedron each prolonged, beyond each lateral vertical stabilizer, by an external horizontal tail unit.

The rear fixed wings are, preferably, fixed rigidly to the lateral vertical stabilizers, at a level higher than that of the central fixed wings and form therewith a rhomboid wing non-contiguous with the external wings. A slot effect is thereby provided, without any risks of aerodynamic instabilities and of vibration at the ends.

Preferably, the rear airfoil surface is, in the plane, W-shaped and comprises two fixed wings with negative sweeps with reverted dihedron, prolonged each by an external horizontal tail unit with positive sweep.

Such an aircraft may be fitted with three propulsion means such as jet-engines or turbo-propellers placed respectively at the rear end of each fuselage, or two jet-engines or turbo-propellers only, placed respectively at the rear ends of each lateral fuselage. Because of the great depth of the roots of the central fixed wings, the air inlets of the jet-engines may be placed at an optimal distance from the trailing edges of the external wings and of the central fixed wings which enables to improve the suction effects on the roots of both central wings and of the external wings and to reduce the drags of aerodynamic interactions with the three fuselages, thereby increasing the lift on the adjacent wing zones.

Such a type of aircraft possesses multiple arrangement possibilities. In particular, the central fuselage may be allocated, at least in a forward section, to the transportation of passengers. In such a case, there are provided, on each flank of the central fuselage, at least two apertures respectively one door in front of the fixed front wing and one door above the interval between the latter and the central fixed wing, each aperture which may be associated with a escape or emergency escape slide directed slantwise with respect to the longitudinal axis and running in front of or above the fixed front wing. If the central fuselage is allocated totally to the transportation of passengers, it is deprived of a jet-engine; the propulsion means being placed respectively at the tail or rear cone of each lateral fuselage. Each flank of fuselage includes then at least one emergency exit placed above the central fixed wing and associated with a escape slide directed slantwise towards the back, running above the central fixed wing and a rear door placed above the interval between the central fixed wing and the rear fixed wing and which may be associated, as an emergency exit, with a escape slide directed slantwise towards the back and running below the rear fixed wing.

Such a type of aircraft is also advantageous for the transportation of freight. In particular, since the cockpit is placed in the nose section of the central fuselage, the nose of each lateral fuselage may open as a whole and form a front cargo door for loading freight of great length, at least in the forward section of the lateral fuselage.

In case when the central fuselage does not carry any jet-engine, it may be fitted, advantageously, with a cargo aperture placed on the ventral portion of its rear modular section and extending substantially halfway up the flanks of the fuselage, said aperture being closed removably by at least one panel which is profiled so as to reconstruct the tail cone of the central fuselage after placement and attachment thereon.

Advantageously, the dorsal upper portion of the rear end of the central fuselage is elevated in the form of a bulge, so as to provide, above a loading floor of the central fuselage, sufficient height for direct insertion, at its level, of a freight container or of a freight pallet by a cargo aperture provided in the tail cone of the central fuselage.

In such a case, both rear fixed wings are fixed, preferably, on this bulge of the central fuselage.

This new type of aircraft with three separate fuselages may then be the object of multiple versions adapted to different operating modes. Moreover, it has appeared that certain versions are particularly well suited to the use of special fuels.

Besides, the central fuselage may be of the same type as the lateral fuselages, or have a greater cross-section.

As can be seen in detail below, the invention enables therefore, from one or two basic fuselages corresponding to one or two categories of airports, to realise at least two ranges of aircrafts with three fuselages and two or three engines, having a capacity of the order of treble that of the basic fuselage, for space requirements remaining compatible with the same category of airport.

For example, one may realise, from one of the basic fuselages, either an aircraft allocated totally to the transportation of passengers, or a mixed aircraft. In the former case, preferably with two engines, the three fuselages have the same cross-section and the central fuselage may be elongated, but does not carry any jet-engine, in order to enable the evacuation of the passengers by the rear.

Conversely, in the case of a mixed aircraft, only both lateral fuselages are entirely pressurised in view of the transportation of passengers. The central fuselage, allocated to freight transportation, exclusively or mixed, is then pressurised only in its forward section including possibly one passenger cabin and the cockpit which may be shielded to be protected against any aggression.

In another advantageous embodiment, the central fuselage may be high enough to include two decks placed at two different levels and extending continuously between both modular sections, respectively front and rear ones, respectively, a lower deck comprising two cargo compartments with the cockpit and an upper deck with vast dimensions for the freight.

Advantageously, the cross-section of the central fuselage may be sufficient to leave, above the upper floor, a loading space having a transversal section corresponding, at least, to the load section of railway transportation or to the international load sections of containers. In such a case, the nose of the central fuselage is fitted, above the cockpit, with a front cargo door opening upwards to provide access to the loading space on the upper floor.

Since it is possible to improve the dimensions of the central fuselage, the latter may be allocated, on at least one portion of its length, to a low density fuel tank.

According to another advantageous characteristic, the aircraft is supported by at least three aligned rows of landing gears which can be folded, respectively, in the lower portion of the central fuselage and both lateral fuselages. Preferably the lateral landing gears rest at the internal flanks of the lateral fuselages so as to reduce the rolling width and facilitate the manoeuvres on the ground.

It has appeared, on the other hand, that such a type of aircraft would enable to implement original procedures to improve considerably the reliability in air transportation. Indeed, the cockpit placed at the front of the central fuselage may be shielded and pressurised separately, the freight and the passengers being distributed among the three fuselages relative to the control conditions.

For example, one may place the safest and possible threatened passengers in the central fuselage and the passengers whereof the control is more difficult or quicker in the lateral fuselages, the access of the passengers in their respective compartment being provided by distinct means. Besides, each fuselage may be fitted with distinct pressurisation means controlled individually from the cockpit.

On the other hand, one may arrange two groups of elevators 33, 33' and 54, 54' respectively on the front fixed airfoil (30, 30') and on the rear fixed airfoil (50, 50'), of three rudders, respectively on the vertical stabilisers of the three fuselages, as well as of two external horizontal fixed supporting surfaces (53, 53' or 53a, 53a'), with elevons (55, 55'), at the back of each lateral fuselage, and devices for improving the lateral control. All these rudders are controlled from the cockpit by means of distinct hydraulic and electric circuits. Thus, in case of trouble or of aggression in a passenger compartment placed in a lateral fuselage or of explosion, for instance in the central fuselage reserved for freight, the aircraft will not be destroyed and remains manoeuvrable.

Other advantageous characteristics of the invention will appear in the following description of certain particular embodiments, given for exemplification purposes and represented on the appended drawings.

FIG. 1 is a schematic top view of an aircraft of a first range with three fuselages and two jet-engines for the transportation of passengers.

FIG. 2 is a side view of the aircraft of FIG. 1.

FIG. 3 is a front view of the aircraft of FIG. 1.

FIG. 6 is a top view of a mixed aircraft for the transportation of passengers and of freight.

FIG. 7 is a sectional view according to I, I of FIG. 6.

FIG. 8 is a front view of the aircraft of FIG. 6.

FIG. 9 is a top view of a jumbo jet of a second range with three jet-engines, with a two-deck central fuselage.

FIG. 10 is a side view of the aircraft of FIG. 9.

FIG. 11 is a front view of the aircraft of FIG. 9.

FIG. 12 is a top view of a three-engine aircraft of the second range with a central fuselage for passengers and freight, fitted with a transversal section greater than that of the lateral fuselages.

FIG. 13 is a side view of the aircraft of FIG. 12.

FIG. 14 is a front view of the aircraft of FIG. 12.

Figure 5:
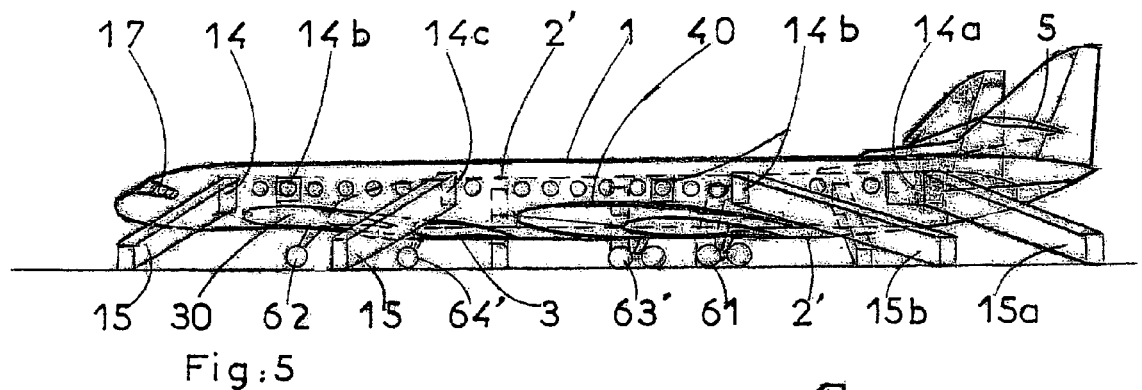
FIG. 5 is a side view of the same aircraft.

FIG. 1 represents a two-engine aircraft of the first range according to the invention comprising three fuselages of same transversal section and two jet-engines. Such an aircraft includes therefore a central fuselage 1 and two lateral fuselages 2, 2', spaced apart transversally from one another and centred on parallel longitudinal axes, respectively 10, 20, 20'. These three fuselages are connected together by three positive airfoil surfaces, respectively front 3, central 4 and rear 5. The front surface 3 and the central surface 4 are formed each of two fixed wings, respectively 30, 30' and 40, 40' which extend on both sides of the central fuselage 1, between the latter and each lateral fuselage 2, 2'. However, both central fixed wings 40, 40' are prolonged beyond the lateral fuselages by external wings 45, 45'.

The aircraft includes also a rear airfoil surface 5 composed of two fixed wings 50, 50' extending, respectively, between the central vertical stabiliser 51 and each lateral vertical stabiliser 52, 52', this rear fixed wing being prolonged by an external horizontal tail unit 53, 53'.

In certain case, however, the rear airfoil surface could be replaced with three separate horizontal tail units fixed to the rear modular sections, or on the vertical stabilisers of each of the three fuselages.

As shown on FIGS. 1 and 2, the leading edges of each fixed front wing 3 and central wing 4 exhibit very high positive sweep, the sweep angle A between each leading edge 31, 41 and the perpendicular to the longitudinal axis 10 of the central fuselage being of at least 40°. Consequently, the nose 11 of the central fuselage is offset ahead of the noses 21, 21' of both lateral fuselages, by a distance D which may be of the same order as the distance E between the axes 20 of a lateral fuselage 2 and 10 of the central fuselage 1.

On the other hand, each free space 12 comprised between the trailing edge 32 of a front fixed wing 30 and the leading edge 41 of the central wing 40 situated behind covers a surface at most of the same order as the surface covered by the front wing 30.

In the example represented on FIG. 1, each fixed front wing 30, 30' is in the form of a parallelogram, the leading edge 31 and the trailing edge 32 being substantially parallel. On the other hand, the leading edge 41 of the central fixed wing 40 possesses a sweep angle of the same order as or slightly smaller than that of the leading edge 31 of the fixed front wing 30.

Such a sweep angle causes forward elongation of the central fuselage 1 with respect to the lateral fuselages and enables the realisation of a large airfoil surface. Indeed, each central fixed wing 40 may extend, along the central fuselage 1 over a depth B at least equal to 2.5 times the spacing (e) between the flanks 13 of the fuselage 1 and 23 of each lateral fuselage 2, 2'. Both central fixed wings 40, 40' form thus a truncated delta wing having a very large airfoil surface. The latter may still be increased by conferring to the trailing edge 42 of the central fixed wings 40 a negative sweep angle of the order of 15°.

Moreover, to improve further the commercial capacity, the central fuselage 1 may also be elongated towards the back with respect to both lateral fuselages 2, 2', this elongation being, however, less emphasized than the elongation D at the front, so as to preserve good pitch balance.

Figure 4:
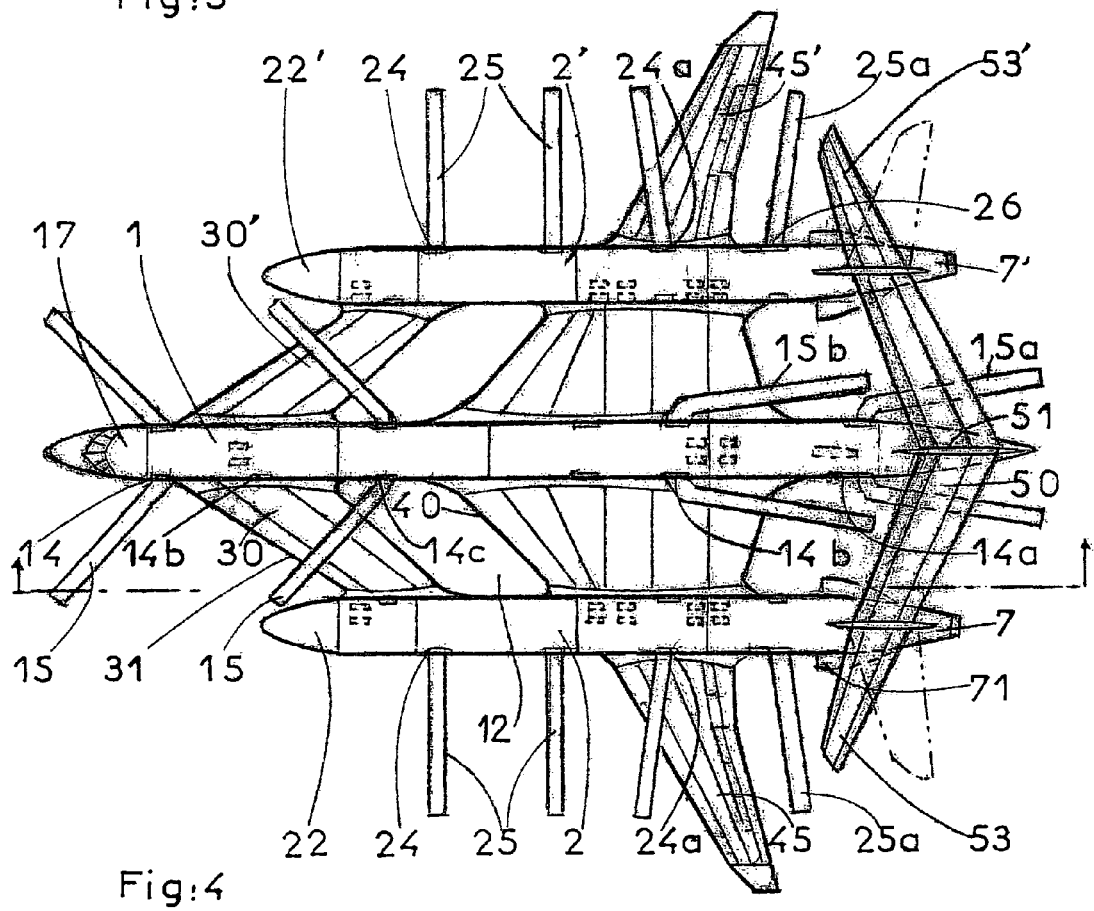
FIG. 4 shows, from above, a passenger transportation aircraft, with its possibilities of evacuation.

As shown on FIG. 4, it is possible to lengthen still the front fuselage with respect to both lateral fuselages by increasing the positive sweep of the leading edge 31 of each fixed front wing 30, whereas the latter may be in the form of a trapezoid.

Thanks to these arrangements which enable to provide very large airfoil surfaces between the three fuselages, and to benefit from slot effects, it is possible to limit the length of the external wings 45, 45' which prolong the central fixed wings 40, 40' beyond each lateral fuselage 2, 2', so that the total span L of the aircraft does not exceed three times the depth B of the central fixed wings 40, 40' along the central fuselage 1.

Thus, it is possible to multiply by three the capacity of the aircraft with respect to a mono-fuselage of same type, while preserving a span compatible with the airports suitable to this size of aircrafts.

As indicated above, the rear stabiliser 5 also forms an airfoil surface comprising two fixed wings 50, 50' which extend between the central vertical stabiliser 51 and each lateral vertical stabiliser 52, 52' and are prolonged, outside thereof, by horizontal tail units 53, 53'.

Taking into account that the central fuselage 1 is prolonged towards the back with respect to the lateral fuselages 2, 2', the rear fixed wings 50, 50' exhibit a negative sweep, preferably greater than that of the trailing edges 42, 42' of the central fixed wings 40, 40'.

On the other hand, the assembly of the rear stabiliser is placed, on the vertical stabilisers 51, 52, 52', at a level higher than that of the central fixed wing 40, 40' and form thus, therewith, a wing of rhomboid type which enables to improve substantially the lift and, consequently, to reduce still the span L for a same transportation capacity.

With respect to rhomboid wings of known type, this arrangement possesses the advantage of avoiding the formation of throttling paths of the air streams, which generate aerodynamic flutters on the ends, the wings being not contiguous but, conversely, fixed rigidly, each on two fuselages.

In the embodiment represented on FIG. 1, the external horizontal tail units 53, 53' have a negative sweep, in the extension of the rear fixed wings 50, 50'. However, they could also be given a positive sweep, as represented as a mixed dotted line on FIGS. 1 and 4, the rear stabiliser having then the W-shape indicated on FIG. 9. Both arrangements enable to use the elevators as anti-turbulence elevons. To this end, one may also use truncated delta marginal ailerons 46, implanted and hinged on the ends of the external wings 45, 45'.

As shown on FIG. 3, both central fixed wings 40, 40' exhibit an upper face 44 with reverted dihedron, i.e. slightly tilted downwards from the central fuselage 1 which is slightly elevated with respect to the lateral fuselages 2, 2'. Conversely, the underwing face 43 is has substantially zero dihedron, each fixed wing 40, 40' being connected to the central fuselage 1 by a structural caisson 47 running beneath said fuselage 1, by a fairing fillet. This arrangement may compensate for the inertia of the lateral fuselages by increasing control around the roll axis.

However, the front 30, 30' and rear 50, 50' fixed wings have, on both their faces, a negative dihedron, the upper faces of the front fixed wings 30, 30' being substantially parallel to the upper faces 44 of the central fixed wings 40, 40'.

Such an arrangement enables maximum lowering of the floor of each lateral fuselage to promote rapid loading thereof and to use shorter central and lateral landing gears, identical in height.

The use of wings having emphasized sweep and long depth and relatively small intervals between the three wings, with more efficient high-lift devices, enables to obtain very high slot effects which promote shorter take-offs at lower speeds and steeper rising slopes thereby enabling to reduce noise at take-off.

Thus, by using three separate fuselages and thanks to longitudinal tightening and to the increase in the depths of the central airfoil surfaces with amplification of their slot effects, one may realise aircrafts having a total span L which is smaller than a mono-fuselage aircraft which, for a same capacity of transportation, would be, moreover, penalised by an excessive length of fuselage and the load distribution over several elevated decks.

Besides, in such a type of aircraft, the load may be distributed over a larger number of landing gears. The main landing gears are not implanted any longer, as in a mono-fuselage, in the underwing of the main wings but in the ventral portions of the three fuselages which are provided so as to be accommodated at the luggage compartments, in front of or behind the caissons of the fixed wings. Each of the three fuselages may thus be equipped of a monotrace alignment comprising one or two main landing gears placed at the central fixed wings and a front landing gear.

For example, in the case of FIG. 1 which corresponds to a passenger transportation aircraft, the central fuselage 1 may be fitted with one or two main landing gears 61 and with a front landing gear 62 and each lateral fuselage carries one or two main landing gears 63, 63' and a front landing gear 64. However, as shown on FIG. 1, the main landing gears 63, 63' and, even, the front landing gears 64, 64' are, preferably, offsets inwardly so as to rest close to the internal flanks 23, 23' of each lateral fuselage 2, 2'. This arrangement enables to reduce the turning radius of the aircraft and to avoid too wide a lane, the global wheel base remaining compatible with relatively narrow taxiways. The main and front landing gears are implanted just below the three commercial loads and the wings need not be strengthened nor made heavier, as in the case of monofuselages, where the main landing gears are distributed over their underwing.

Moreover, it should be noted that the short development, towards the back, of a three-fuselage aircraft, with respect to an equivalent mono-fuselage aircraft and the fact that the jet-engines are not suspended from the underwing of the wings enables to use landing gears which are less high and lighter than in the case of a mono-fuselage. Nevertheless with shorter landing gear legs, it would be possible to use a very large portion of the equipment and of the kinematics of the landing gears of the either of the basic fuselages.

As can be seen below, such a type of three-fuselage aircraft and three airfoil surfaces with relatively small span possesses multiples arrangement and usage possibilities for the transportation of passengers, the mixed transportation or the transportation of freight.

Moreover, such a type of aircraft may, not only, be propelled by a conventional fuel but also adapted for the usage of low density fuels.

FIGS. 1 to 5 show a type of aircraft of the first range, with a central fuselage 1 extending on a greater length than the lateral fuselages 2, 2' but exhibiting substantially the same cross-section. Such a type of aircraft may be used, either totally for the transportation of passengers, or in mixed version, the passengers being placed in the lateral fuselages and in at least one portion of the central fuselage. Thanks to the presence of three fuselages, the aircraft may be propelled by two jet-engines or turbo-propellers 7, 7' placed at the ends of both lateral fuselages 2, 2'. Conversely, the central fuselage 1 is deprived of jet-engine, which enables to realise the rapid evacuation of the passengers situated in the middle and at the back of the central fuselage, even in case of fire of a lateral jet engine.

As shown on FIG. 4, the access of the passengers to the lateral fuselages may take place easily through the doors 24 placed on their external flanks and which may be fitted with escape slides 25 to serve as an emergency exit. An emergency exit 24a may also be provided above the external wing 45. Escape slides 25 may be deployed transversally towards the outside.

The rear portion of each lateral fuselage may also serve for freight transportation, each external flank being fitted with a cargo door 26 wherein may be provided a passenger door associated with a escape slide 25a and placed with a protection margin in front of the air inlets of the jet engine 7.

When the central fuselage 1 is provided for the transportation of passengers, the seats are placed, preferably, in a front compartment to which can be accessed through the doors 14, 14c placed in front of and in the interval between the front 30 and central 40 fixed wings. These doors 14, 14c may be associated with escape slides 15 running in front of or slantwise above the fixed front wing 30 with an angle of approximately 45° towards the front.

Another access door or, possibly, a cargo door 14a may be provided on each flank of the central fuselage, behind the trailing edge of the central fixed wing 40. This door may be fitted with an escape slide 15a running slantwise below the rear fixed wing 50, and forming an angle of approximately 15° with the axis 10.

The central fuselage may also be fitted with front and central emergency exits 14b, placed above the fixed wings, respectively front 30 and central 40 fixed wings and fitted with escape slides directed slantwise, towards the front or towards the back, so as to run above said fixed wings.

FIGS. 6, 7, 8 show an aircraft of the first range with two more powerful engines, enabling, in particular, to improve the load capacity of the aircraft for a usage in mixed passenger-freight version, or in freight version exclusively. In such a case, the front fixed wings 30, 30' with reverted dihedron, have larger trapezoid shapes with leading edge sweeps and greater profile lengths than those of the wings 30, 30' in the form of parallelograms of the aircrafts of the first range according to FIGS. 1 to 3. The same process applies to the rear horizontal tail units 50, 50' which also adopt a trapezoid shape with more pronounced trailing edge sweeps.

As will be seen below, it is advantageous, for enhanced reliability, to reserve the central fuselage for freight transportation. In such a case, it is preferable to increase the height and the width of the central fuselage 1, as indicated on FIGS. 6, 7 and 8, to increase the cross-section, and to adapt the latter for instance, to the load section of the railways. The central fuselage 1 may then be fitted, in its tail cone, with a wide cargo aperture closed by one or several removable panels 18 which are profiled so as to reconstruct, after closing, the form of the tail cone. This cargo aperture may be of sufficient dimensions to enable, for instance, direct introduction at the loading floor of a container to the load section of the railways. For easier introduction, the upper portion of the tail cone may be fitted with a bulge 16 whereon the internal ends of the rear fixed wings 50, 50' are fixed.

As in the passenger version of FIGS. 1 to 5, the propulsion is ensured by two jet-engines 7, 7' but with higher thrust, which are integrated to the rear cones of both lateral fuselages 2, 2' and convergent towards the top skin of the central wing and towards the yaw axis. These jet-engines are fed by lateral air inlets 71, which may be dissymmetrical, provided on both flanks of each of the lateral fuselages.

When the central fuselage 1 is allocated to freight transportation, it is fitted, advantageously, with two main landing gears 61a, 61b mounted at the central fixed wings and offsets longitudinally so as to fold up in front of and behind the wing caissons. The lateral main landing gears 63, 63' are offset, as previously, towards the internal flanks of the lateral fuselages 2, 2', as well as the front landing gears 64, 64'.

The central fuselage 1 carries, in its front portion, the cockpit 17 and, possibly, a passenger compartment.

In mixed version, the lateral fuselages are allocated to passengers and are therefore pressurised.

However, in a third version, the lateral fuselages may also be allocated to freight transportation, whereas their nose section 22 may open so as to form a front cargo door for loading great length freight.

The same elements may be extrapolated to realise a jumbo jet of the second range, as represented on FIGS. 9, 10 and 11.

In such a case, a third turbo jet engine or turbo-propeller 72 is installed on the modular tail cone of the central fuselage 1.

This central fuselage may comprise two decks extending over its whole length, respectively a lower deck 8 and an upper deck 81. The medial and ventral portions of the two-engine version described previously may, indeed, be transformed into a lower deck 8 of greater width, capable of receiving, for instance, two containers of so-called LD3 type. The floor rests directly on the horizontal internal lower rims of these frames. The access in both cargo compartments of the lower deck 8 is realised by means of two wide lateral larges doors on its vertical flanks, the one 14 at the front between the front wing and the leading edges 41 of the main wing 4, the other 14a just behind the trailing edges 42 thereof.

The cockpit 17 which remains in a position similar to that occupied in the previous two-engine version, is placed in the modular nose section of the lower deck, in front of the roots of the front wings 3, in the extension of the floor 8 of the lower deck and below the upper deck 81. The latter extends also over the whole length of the central fuselage 1 whereof the cross-section may be considerably enlarged, as represented on FIGS. 10 and 11, in order to provide a very sizeable loading space accessible by a large front cargo door 82 opening upwards.

This jumbo jet with three jet-engines may be an airliner, benefiting from a longer radius of action thanks to the vast development of the central wing 4 whereof the sweeps and countersweeps are emphasized. The truncated delta central fixed wings 40, 40' spread more than previously in depth and in width but a little less in span. Their end ribs 48 may be offset vertical to the external flanks of the lateral fuselages.

With respect to the two-engine version, the spacing between the fuselage 1 and the lateral fuselages 2, 2' may be increased by prolonging the truncated delta wings 40 homothetically, by adjoining two trapezoid section whereof the depths and the thicknesses are very large, but the span is rather short.

Besides, the extrapolated depths of the roots of the front and rear stabilizers in the central fuselage generate more intense slot effects and tunnel effects with the central fixed wings 40, 40', thus prolonged.

This central fuselage 1 with two decks 8, 81 is substantially lengthened towards the front and slightly less towards the back.

The most robust portion of the central fuselage 1 is formed using the strengthened floor of the upper deck 81, supported and propped by the caissons of the truncated delta wings 40, 40' or of front stabilizers 30, 30' and by the more pressurised structure of the lower deck 8. Said structure is provided with coverings and frames which are thicker and more resistant than the rather thin cell above this floor.

For certain versions, the cross-sections may be enlarged by adjoining covering panels in the middle of the flanks or domed ventral and dorsal portions of the lower 8 and upper 81 decks, the front and rear modular sections being slightly longer. These specific versions may be suited to the particular requirements of the military or of some transporters specialised in large-sized freight.

As shown on FIG. 11, the coverings of the vertical central fuselage (flanks) and the horizontal coverings (dorsal and ventral), may be slightly domed according to a very flat elliptic profile. This configuration increases gradually the width of their frames and girders towards the middle of each of them.

Therefrom result fewer flutters or aeroelastic vibrations and more efficient and stabler aerodynamic shape in the skiddings generated by the turbulence and the engine failures. In case of oblique attack and vortices, this form of fuselage generates fewer drags and destabilising eddies than a central cargo fuselage of rectangular section. On the other hand, this domed section adapts better to small pressurisation, for instance from 2 to 4 psis. Indeed, when it is used for the transportation of freight, the central fuselage 1 may be little pressurised except in the cockpit 17. It may therefore be made lighter, which constitutes a weight-saving and low-cost solution.

Taking into account the high load of such a type of aircraft, of the second range, the central fuselage 1 which possesses a greater cross-section, may be fitted with two front landing gears 62, 62' and with four main landing gears 61, 61' implanted in two monotrace couples close to the vertical flanks of the central fuselage, in front of and behind the caisson of the truncated delta fixed wings 40, 40' running therethrough. Between the lateral housings of the wheels, there is a free central space for a freight container.

Therefrom results, on the runway, a distribution of the static and dynamic loads substantially proportional to the on-flight distribution of the lifts of the wings and of the load masses. Thanks to this implantation of the landing gears below the fuselages, the wings are not subjected to very heavy reinforcements. The presence of four steerable front landing gears 62, 62', 64, 64' arranged as a triangle, provides excellent directional stability on runways with poor adhesion and confers good control in turns with short steering angles.

On the other hand, an auxiliary power unit 73 (A.P.U.) may be installed with hydraulic, electric or air conditioning equipment for the assembly of the three fuselages, either between two main landing gear housings or, preferably, just in front of the central jet engine, in the central modular ventral portion ahead thereof.

The height of the cargo compartments of the lower deck is at least equal to the maximum thickness of the caissons of the truncated delta wings 40 and extends between both housings of the main landing gears and the jet engine at the rear, or the cockpit at the front. Their thicker structures carried by a more robust frame, which props the floor of the upper deck, supports higher pressurisation rate, for instance 4 psis, than that of the upper deck which may be of 2 psis. The front compartment may benefit from the air conditioning of the cockpit through the pressurisation control valves established on its rear wall and may serve for transportation of live animals and/or of freight allocated by the high deviations in temperatures and atmospheric pressures.

Besides, for some time, it has been contemplated to use, for propulsion, low density fuels such as liquefied hydrogen, methane, etc. . . . In practice, however, the use of such fuels could not be developed on conventional monofuselage aircrafts for safety and implementation reasons.

It has appeared, conversely, that three-fuselage aircraft was particularly suited to such an application, provided the central fuselage is much bigger than the lateral fuselages.

Such is the case, in particular, for the embodiment of FIGS. 9, 10, 11 wherein, according to another advantageous characteristic, the very large volume of available load enables to use, for propulsion, a low density fuel, this architecture enabling, on the other hand, multiple possibilities of rapid and cheap transformations.

For example, the front and rear modular portions of the upper deck 81 of the central fuselage 1 may receive two tanks of such a fuel, with thermal insulation over their whole periphery. These tanks, formed by removable containers, may be prolonged more or less towards the centre of the aircraft to obtain action radii of variable sizes. The freight may be docked between both these forward and rear zones in the large volumes of the upper deck 81 with maximum cross-section.

The freight may be placed in containers which may be replaced with low density fuel tanks for application to medium and long distance airliners.

All the freight and fuel containers are loaded like standard pallets, by the front cargo door 82 situated above the cockpit 17.

It should be noted, moreover, that the sizeable thickness and depth of the truncated delta central wing 40, 40', enable to provide tanks therein for a large portion of the cryogenic fuel, with good output for the calorific insulation thereof.

These insulated and lagged low density fuel tanks (hydrogen or methane), have systems intended for plugging the internal feeding circuits thereof into those on-board.

According to another variation, a low density fuel may be contained in a fixed tank integrated in the rear portion of the central fuselage 1 over the whole height of the decks. Similarly, on the upper deck 81, the modular nose cone and its front cargo door 82 may be replaced with the nose section of a removable container-tank having the necessary modular form and the necessary structural resistance. The latter is docked to the front floor of the upper deck and on the front vertical section of its fuselage cut vertical to a strong frame. Therefrom derives lighter and simplified front arrangement as well as rapid intermediate stops.

In another variation still, the front container-tank is eliminated. It is replaced with a removable prolongation of the rear fixed tank, abutting thereto and docked in the rear portion of the upper deck 81. The balance variations, from take-off to cruising speed, resulting from more or less complete filling fuel burn of these fixed and removable rear tanks on-flight, may be compensated for by the weight of the standby and clearance reserves, of kerosene which is three times as heavy and which may be stored in structural tanks provided in the caissons of the front airfoils 30, 30'. Towards the end of cruise when the low density fuel of the rear fixed tank is emptied, an excessive forward balance may be compensated for by the transfer of kerosene of the front airfoils 30, 30' into the empty tanks of the external wings 45, 45'.

Both fuel circuits, hydrogen and kerosene and the architecture with three airfoil surfaces with vast front and rear stabilizers or rear fixed airfoils enable rather short stops with less complex handling of the fuel and freight containers, which improves the commercial speed significantly.

The wide two-deck central fuselage and the shorter and narrower lateral fuselages enable load distributions in the centre and at the ends of the central wings which are proportional to the different depths and surfaces of the sectors of wings affected by each fuselage. The same goes for the distribution of the static and dynamic loads on the landing runway, with four alignments of two main landing gears implanted in tandem in front of and behind the different enhanced depths of the caisson of the central wings 40, 40' and because of the forward position of the front landing gears established at the underwing of the front wings 30, 30'. Such distributions and the gains obtained with a lighter structure are permitted by a judicious choice of the increased sweeps for the three wings.

This mixed freight/passenger arrangement with a central cockpit at the lower deck and, possibly, the back-up thrust of an auxiliary power group A.P.U. give the possibility of transporting heavy and cumbersome loads without detriment to the comfort of the passengers, while benefiting from rapid handling in all the stops with very efficient reliability conditions.

In this view, it has appeared that such a type of three-fuselage aircraft would enable to improve the reliability and the safety of air transportation by implementing original boarding and distribution modalities of the passengers, of the luggage and, possibly of the freight.

In the all-passenger version as represented on FIG. 5, the airline may select the most reliable passengers or the passengers most exposed to terrorist attacks in order to place them in the central fuselage where the technical crew is situated.

The lateral fuselages, without cockpit, receive the passengers in transit from suspicious stops or those whereof the nationality or the information gathered lead to suspect the presence of potentially dangerous persons.

The luggage is placed in the compartments sub-adjacent to the passengers selected according to the process above, in order not to leave a suitcase with a bomb below a cabin housing the passengers specially exposed to terrorist attacks. There is no trap door in the cabin floors to access to the luggage or cargo compartments.

Thanks to the distribution of the passengers into three fuselages, the boarding after the search, takes place from two or three different, hermetic boarding halls, using busses or access gateways, distinct from each other, to prevent weapons from being passed from one group to another.

This procedure enables to isolate at least one third of the passengers in almost all circumstances, as well as the technical crew, thanks to the shield and to the locking system of the door of the cockpit. If case of high-jacking, the probabilities are high that the pirates remain confined in one of the lateral fuselages further to the permanent application of systematic groupings. In such a case, it becomes easier to free at least the third of the travellers and to change the technical crew, if not to evacuate said crew after sabotaging the starting system of the jet-engines.

It is also possible to install in the three cabins television cameras and microphones, enabling the pilots and the commercial crew to detect and to follow any high-jacking attempt. The pilots then initiate the depressurisation of the cabin under attack, while the stewardesses and stewards use their oxygen masks, and the other cabins benefit from normal air conditioning. The crew who remain in control of their decisions and manoeuvres proceeds to an emergency descent towards the closest airport, preferably a military facility, where it will be easier to organise the liberation of the hostages.

In case when the central fuselage is dedicated to freight transportation, it is easier to control the absence of stowaways in the containers. Moreover, the shielded door of the cockpit remains locked throughout the flight. These precautions protect the pilots against any high-jacking action. In mixed freight/passenger version in the lateral fuselages, the shielded door communicating with the freight compartment is also locked.

Another solution to impede any irruptions in the cockpit, consists in using the central fuselage as a cryogenic fuel tank, by suppressing any freight compartment between this station and the tank.

Moreover, such a three-fuselage aircraft with three positive airfoil surfaces is capable of better resisting a local explosion than a mono-fuselage having only a single line of resistance and wherein the destruction by explosion of a potion of its single fuselage may cause immediate failure thereof.

Conversely, the quadruple trapezoid configuration of a three-fuselage aircraft with wings distributed in the centre and at each front and rear end generates a double propping system, one in the horizontal plane at the lateral junctions of the fuselages, the other in the vertical plane by offsetting in height the airfoil surfaces, as well as significant distances between the front and rear stabilisers with respect to the luggage compartments. Thus, the explosion of a suitcase in a luggage compartment does not cause automatically the fracture of a fuselage into two portions, especially with a multiple girder skeleton. There will always remain structural elements which are strong enough such as stringer and girders filled with honeycombs, which will avoid complete breakage. They will preserve the major part of the skeleton, even if a large portion of the skin has been torn off. The robustness of both other fuselages and the transversal junctions will prevent such breakage. Even explosions in both lateral fuselages, but one ahead of the wing and the other at the rear will not involve the destruction of the aircraft. By reducing the speed and the altitude and by turning with small tilting angles, the pilots could find an emergency plot for short emergency landing. A three-fuselage aircraft benefits therefore from better chances to escape a terrorist attack, especially if the loading operations at each stop avoid placing always in the same compartment a given type of parcel or always to group the shipments intended to specific stops, at the same locations. The triple central links between the three fuselages, constitute a significant superiority on the conventional or bi-fuselage aircrafts.

Another advantage lies in the fact that there are two groups of two distinct elevators, one at the front, the other at the rear, three rudders, and three diversified assemblies acting around the roll axis, the marginal ailerons and the wing flaps/ailerons on the external wings, with the addition of monobloc elevators which are manoeuvrable as elevons. Each of these controls operates using electric or hydraulic circuits, which are housed in different fuselages. They may be isolated from one another in case of short-circuits, of pressure drop or blocked rudders or controls. Putting out of service a given group thereof may be compensated for by emphasized steering of the other group before that the aircraft, then seriously damaged, engages into positions which are difficult to control.

Moreover, the different hydraulic, electric (general network), electronic (navigation, communications) pieces of equipment, the aerodynamic central station; etc., are distributed over the three fuselages, in order to divide the risks and also to facilitate the maintenance during a stop. Their distribution over the numerous ventral, lateral portions of the triple fuselage provides spaced access for each thereof and avoid mutual disturbance between the different services involved in the implementation of the aircraft. Therefrom result shorter stops and easier surveillance, and consequently enhanced reliability.

For the mixed versions with freight stored in the central fuselage, the explosion of a bomb therein would only cause limited depressurisation, because the central fuselage, dedicated to freight transportation, is fitted with a maximum pressurisation rate of 2 to 4 p.s.i. The crew protected by an armoured partition and in a specially pressurised cabin, will continue to breathe normally or, at worst, will use the oxygen masks. In the lateral fuselages, the passengers will not be disturbed. The aircraft will not be forced into a rapid descent, it will continue to fly at sufficient altitude to reach safely an emergency airport.

Thus, a three-fuselage aircraft according to the invention enables the application of more efficient preventive measures and offers moreover, high resistance to destructions of all sorts, more compact shapes and higher propulsive and structural aerodynamic outputs.

It should be noted, moreover, that the emphasis on the sweeps of the wings and the permanent efficiency of the slot effects, with the high-lift devices in retracted position, would enable to reach faster cruising speeds and higher flight levels, above the current levels, which are saturated by the high density of the traffic.

Such composite aircrafts, where the cargo compartments are clearly separated and specialised with high loading capacities, suitable for various commercial loads, provide a profitability and a safety that could not be achieved with a conventional monofuselage architecture, in particular with two or three decks which are very high above the runway, which adapts with difficulty to the current airport infrastructures.

Moreover, the vast volume available authorises the assembly of engines of various types in rear modular sections which form soundproof external fairings.

But the invention is obviously not limited to the single embodiments and to the modifications which have just been described, other variations and other arrangements may be contemplated without departing from the protection framework of the invention.

For instance, one could further improve the sweeps and the depths of wings, and the distribution of the airfoil surfaces in order to improve the loading capacity of the central fuselage.

Moreover, it has appeared that the same type of aircraft may be adapted to various usages by varying the dimensions of the central fuselage with respect to the lateral fuselages, the depth and the sweeps of the fixed wings between the fuselages and, obviously, the interior arrangements.

It is thus that the reliability and safety measures which have just been described, find an optimum application on a three-engine long distance jumbo jet, as represented on FIGS. 12, 13, 14.

Such an aircraft is of the type described above, including a central fuselage which is larger than the lateral fuselages.

However, the central fuselage is provided essentially for the transportation of passengers. Consequently, the central cargo fuselage, which is high and wide, little pressurised and lightened of FIGS. 9, 10, 11 is replaced with a central circular or two-lobe fuselage (1) having a cross-section greater than that of the lateral fuselages (2, 2'), so as to comprise at least one or two additional seats per seat row.

In compensation for its shorter height with respect to the version of FIGS. 9, 10, 11, the central fuselage 1 may be longer and fitted at the front of passenger doors (14, 14b, 14c) and at the back of a lateral cargo door 94 which is easier of access.

Indeed, since, as in the preceding version, the aircraft is fitted with a third jet engine or turbo-propeller 72 mounted at the modular tail cone of the central fuselage 1, only the forward section 91 thereof, extending on approximately half its length, is designed for the transportation of passengers in order to enable rapid evacuation thereof forwardly in case of fire of the central jet engine 72 or of one of the lateral jet-engines 7, 7'. This forward section 91 is therefore the only one pressurised at 8 p.s.i., whereas the rear portion 92, which possesses substantially the same cross-section, is little or not pressurised and may be lightened, since this rear portion 92 may contain either a freight compartment 93, serviced by a rear cargo door 94, or low density fuel tanks.

When propelled by kerosene, this central fuselage 1 includes two lower luggage compartments 95, 96 and a single deck 97 at the floor of which lie the cockpit 17, the front passenger cabin 91 and the rear freight compartment 93, which may be separated from the forward section 91 by a pressure bulkhead.

When propelled by low density fuels, the single deck or floor 97, does not exceed the rear pressurised partition of the passenger cabin 91, and lagged tanks may be established over the whole height and the width of the central fuselage 1, which does not include any luggage compartment beneath these tanks. Possibly, especially for propulsion using refrigerated liquid methane, the thick trapezoid caissons of the truncated delta central wings 40, 40', may be transformed into lagged tanks for low density fuels in order to increase the radius of action. This fuel recovery capacity enables possible arrangement of a rear end compartment for the freight and for the luggage which is installed just ahead of the firewall of the rear central engine 72 and around its internal air inlet conduits 71.

This new arrangement of the low density fuel tanks occupies locations which are difficult of access in the central fuselage, above the central wings 40, 40' and the intervals 12, 12' between said wings and the front tail unit 30, 30', facilitate rapid boarding of freight pallets or containers and promote better balance. The transformation of structure is the easiest and the lightest possible.

On the other hand, this cylindrical or two-lobe central fuselage 1, less high than that almost rectangular, designed for freight, of FIGS. 9, 10 and 11, enables to imbed rear horizontal tail units 50, 50', towards the lower sections of the vertical stabilizer 51, while remaining high above the dorsal portion of the engine fairing 72. Therefrom derive margins which reduce aerodynamic interactions and avoid any shocks among the freight containers on these tail units 50, 50' as they are loaded in stops.

It appears therefore that such a type of three-fuselage aircraft connected by wings with emphasized sweep enables to realise multiples versions, including two or three engines, from one or two basic fuselages each corresponding to a certain category of airport.

Indeed, as indicated above, the airports are classified into different categories and, for each of them, it is possible to define the characteristics of a basic fuselage from which are realised the lateral fuselages of the aircraft, whereas the central fuselage may have the same cross-section with greater length, as in the versions of FIGS. 1 to 5, or a greater cross-section. In such a case, the central fuselage of a category may be formed out of the basic fuselage of the next category up, in particular for the transportation of passengers, as in the case of FIGS. 12, 13, 14.

But the central fuselage may also be elevated, as in the case of FIG. 7, for the transportation of containers, or even include two decks, as in the case of FIGS. 9, 10, 11, for the long distance jumbo-jet version.

In such a case, the spacing between the central fuselage and the lateral fuselages may be increased by prolonging the truncated delta wings of the previous version, homothetically, by the adjunction of two trapezoid sections which are rather deep and thick, but with rather short span, the rectilinear leading and trailing edges being simply extended. One may thus use all the structure and equipment elements of the smaller capacity version.

It should be noted that the additional surface area of the central wings 40, 40' provides a vast complementary volume for the fuel tanks and may be obtained with moderate span increase thanks to the emphasized sweeps of the leading and trailing edges.

Similarly, the front 30, 30' and rear 50, 50' fixed wings which have, preferably, a trapezoid configuration may be extrapolated homothetically from the elements of the two-engine version. Therefrom results appreciable increase in their wing surfaces which is added to those of the central wings 40, 40', which enables not to over-improve the spacing E between the axes 10 of the central fuselage and 20, 20' of the lateral fuselages.

One has thus realised a new type of aircraft having a very large capacity of transportation and whereof the gauge of the main landing gears and the span of the main wing remain, however, within limits compatibles with the standards of the airports which facilitates the insertion of such type of aircraft between the boarding fingers of an air terminal intended initially for monofuselages aircrafts having notably smaller commercial capacities.

For each category of airports, the different possible versions are classified into at least two ranges, respectively a two-engine range or a three-engine range and enable to quite various uses.

Thus, from one or two basic fuselages corresponding to one or two types of aircrafts, for instance business or regional aircraft, medium-distance or long-distance, it will be possible to define at least two ranges of aircrafts respectively with two or three engines, each including several versions corresponding to diverse usages. Such aircrafts will have, in all cases, a transportation capacity at least treble that of the basic fuselage and could, however, be accommodated in the same airports, without any significant modification of the installations.

The sole aim of the reference signs inserted after the technical characteristics mentioned in the claims, is to facilitate the understanding thereof and do not limit the extent thereof.

The invention claimed is:

1. A method for improving air travel safety comprising:
using an aircraft comprising
a central fuselage and two lateral fuselages spaced apart transversally from one another, the two lateral fuselages being located one on either side of the central fuselage,
a rear vertical stabilizer on each of the central fuselage and lateral fuselages,
a rear fixed airfoil extending between and fixed rigidly to, the rear vertical stabilizer of each of the lateral fuselages and the rear vertical stabilizer of the central fuselage,
the rear fixed airfoil exhibiting a negative sweep and being prolonged beyond each lateral fuselage by an external rear airfoil,
a front fixed airfoil and a central truncated delta wing extending between each of the lateral fuselages and the central fuselage to connect each lateral fuselage to the central fuselage, the front fixed airfoil and the central truncated delta wing each having a leading edge exhibiting a positive sweep angle of at least 40°, the central truncated delta wing having a trailing edge with a negative sweep angle of about 15°, and the central truncated delta wing being prolonged beyond each lateral fuselage by a central external wing;
locating a cockpit in a forward portion of the central fuselage; and
distributing cargo and/or passengers in the central and lateral fuselages, the cockpit being located in a separately armoured and pressurized compartment, wherein a first group of passengers is located in the central fuselage and a second group of passengers distinct from the first group of passengers is located in the lateral fuselages, and wherein a means of accessing the passengers in respective fuselages is separate.

2. The method of claim 1, wherein the central and lateral fuselages are equipped with separate pressurization means, each pressurization means being controlled from the cockpit.

3. The method of claim 2, the aircraft further comprising a group of elevator controls on each of the front fixed airfoils and rear fixed airfoils, a rudder on each rear vertical stabilizer, an aileron on each external rear airfoil, wherein said elevator controls, rudders and ailerons are controlled from the cockpit by distinct hydraulic and electrical circuits which are housed in different fuselages.

4. The method of claim 1, wherein the central fuselage is partly reserved for cargo and the passengers are distributed in the lateral fuselages.

5. The method of claim 4, the aircraft further comprising a group of elevator controls on each of the front fixed airfoils and the rear fixed airfoils, a rudder on each rear vertical stabilizer, an aileron on each external rear airfoil, wherein said elevator controls, rudders and ailerons are controlled from the cockpit by distinct hydraulic and electrical circuits which are housed in different fuselages.

6. The method of claim 1, wherein the first group of passengers comprise passengers which are at least one of a low security risk and whose security could be threatened, and wherein the second group of passengers comprise passengers which are a high security risk.

7. The method of claim 6, the aircraft further comprising a group of elevator controls en each of the front fixed airfoils and the rear fixed airfoils, a rudder on each rear vertical stabilizer, an aileron on each external rear airfoil, wherein said elevator controls, rudders and ailerons are controlled from the cockpit by distinct hydraulic and electrical circuits which are housed in different fuselages.

8. The method of claim 1, the aircraft further comprising a group of elevator controls on each of the front fixed airfoils and the rear fixed airfoils, a rudder on each rear vertical stabilizer, an aileron on each external rear airfoil, wherein said elevator controls, rudders and ailerons are controlled from the cockpit by distinct hydraulic and electrical circuits which are housed in different fuselages.

* * * * *